(12) United States Patent
Dück et al.

(10) Patent No.: US 8,281,677 B2
(45) Date of Patent: Oct. 9, 2012

(54) ELECTROMOTIVE LINEAR DRIVE

(75) Inventors: Heinrich Dück, Espelkamp (DE); Christian Müller, Steinheim (DE)

(73) Assignee: Dewertokin GmbH, Kirchlengern (DE)

( * ) Notice: Subject to any disclaimer, the term of this patent is extended or adjusted under 35 U.S.C. 154(b) by 0 days.

(21) Appl. No.: 11/816,202

(22) PCT Filed: Feb. 16, 2006

(86) PCT No.: PCT/EP2006/060031
§ 371 (c)(1),
(2), (4) Date: Sep. 9, 2008

(87) PCT Pub. No.: WO2006/087365
PCT Pub. Date: Aug. 24, 2006

(65) Prior Publication Data
US 2009/0044646 A1    Feb. 19, 2009

(30) Foreign Application Priority Data
Feb. 17, 2005   (DE) ............... 20 2005 002 585 U (51) Int. Cl.
*F16H 29/20*   (2006.01)
(52) U.S. Cl. ........................... 74/89.23; 74/89.39
(58) Field of Classification Search ............... 74/89.23, 74/89.34, 89.37, 89.38, 89.39; 188/76, 77 R, 188/71.5, 82.5, 166; 192/41 S, 81 C
See application file for complete search history.

(56) References Cited

U.S. PATENT DOCUMENTS

| 2,837,931 | A | 6/1958 | Brundage |
| 4,250,762 | A | 2/1981 | Weatherby et al. |
| 4,489,248 | A | 12/1984 | Petersen et al. |
| 2004/0093969 | A1* | 5/2004 | Nielsen ................. 74/89.23 |

FOREIGN PATENT DOCUMENTS

| CH | 693840 | 3/2004 |
| EP | 1457710 | 9/2004 |
| JP | 01-193138 | 3/1989 |

* cited by examiner

*Primary Examiner* — Thomas R Hannon
*Assistant Examiner* — Phillip A Johnson
(74) *Attorney, Agent, or Firm* — Barnes & Thornburg LLP (57) ABSTRACT

An electromotive linear drive with a drive unit having a drive motor and a spindle driven by the drive unit. The drive includes a spindle nut disposed on the spindle. The spindle nut is movable longitudinally on the spindle. A lifting tube is operatively connected to the spindle nut so that the spindle nut moves together with the lifting tube. A connecting part is disposed on a free end of the lifting tube. A braking assembly is disposed in the lifting tube and is operatively connected to the spindle nut via an adjustable, frictional connection. The braking assembly is manipulable. During operation of the drive motor, the spindle nut frictionally engages the braking assembly, preventing rotation of the spindle nut. The frictional connection may be adjusted to permit the spindle nut to rotate with respect to the spindle, thereby manipulating a linear speed component of the lifting tube.

16 Claims, 8 Drawing Sheets

ELECTROMOTIVE LINEAR DRIVE

CROSS-REFERENCE TO RELATED APPLICATION(S)

This application is a National Phase Entry based upon and relying for priority on PCT/EP2006/060031, filed on Feb. 16, 2006. In turn, the PCT application relies for priority upon German Patent Application No. 20 2005 002 585.2, filed on Feb. 17, 2005. The contents of both applications are incorporated herein by reference.

FIELD OF THE INVENTION

The invention relates to an electromotive linear drive, which may also be referred to as an electronic linear drive or an electric linear drive depending upon the terminology employed by those skilled in the art. More specifically, the invention concerns an electromotive linear drive with a drive unit composed of a drive motor and a speed reduction gear unit. The speed reduction gear unit to drives a spindle onto which a spindle nut has been placed. The spindle nut is movable in the longitudinal direction of the spindle dependent on the rotational direction of the spindle. The spindle nut includes an adjustment function where the spindle nut articulates via a synchronously movable lifting tube on whose free end, turned away from the drive unit, a connecting part is placed. The linear speed component of the lifting tube is controllable, at least when the drive motor is turned off. The linear speed component is controllable via a braking assembly equipped with a braking and transmission mechanism.

DESCRIPTION OF THE RELATED ART

As may be appreciated by those skilled in the art, electromotive linear drives may be utilized for very diverse adjusting functions in order to adjust structural components coupled with the connecting part of the lifting tube. This can be achieved directly, for example via a lever or a fitting.

The adjustment speed of the connected structural components is relatively low since the number of revolutions of the spindle, with the drive motor turned on, is also relatively low. The counter rotational adjustment motions of a linked structural component normally occur when the drive motor is turned on, i.e., the adjustment direction of a linked structural component is based on the rotational direction of the spindle, or, respectively, on whether the spindle nut is moved away from the drive unit or in the direction of the drive unit.

As also may be appreciated by those skilled in the art, there are applications in which the structural component that is normally adjusted by means of the linear drive needs to be moved automatically and abruptly into a starting position, i.e. by means of its own weight. For these cases, the drive connection between the drive unit and the spindle is interrupted by means of a so-called decoupling, e.g., by means of a clutch. In the industry, this action is termed as the release of a drive.

If the drive connection between the drive unit and the spindle is interrupted or released and the threaded spindle is not self-locking, the connected structural component moves abruptly into a starting position due to its own weight. It is desired to avoid this situation, especially in the context of furniture. As such, it is known to equip the release or decoupling unit with a braking mechanism so that the number of revolutions of the decoupling unit relative to the drive casing is rotatably adjustable. If so constructed, the number of revolutions of the spindle may be controlled when the drive connection between the drive unit and the spindle is interrupted.

As should be appreciated by those skilled in the art, linear drives of the type in question here must be seen as mass-produced products. Accordingly, they should be manufactured as simply and as cost effectively as possible. In the case of known linear drives with braking mechanisms that control the number of revolutions of the spindle with the drive motor turned off, both braking mechanisms and decoupling units are needed. Accordingly, the design engineering expenses are relatively high, meaning that the manufacturing costs of the linear drives are high as well.

As should be appreciated by those skilled in the art, therefore, there exists at least a need for linear drives that are more cost effective than embodiments currently known.

SUMMARY OF THE INVENTION

The invention addresses at least the deficiencies noted in the prior art. Specifically, it is an aspect of the invention to provide a linear drive with a simple engineering design and with a minimum number of structural components. With such a design, in the event of an analogous release, the adjustment speed of a structural component connected to the linear drive is increased relative to the normal speed by controlling the linear speed component of the lifting tube. This is done with the drive motor turned off.

To address the deficiencies in the prior art, the invention provides a spindle nut in functional connection with a brake mechanism. During adjustment of the lifting tube with the drive motor turned on, the spindle nut is force-fitted in the housing of the linear drive in an immovable fashion. With the drive motor turned off, the force acting from the brake mechanism on the spindle nut may be controllably reduced such that the spindle nut is rotatable. In this fashion, the linear speed component of the lifting tube is manipulable through the braking forces transmitted from the braking mechanism to the spindle nut.

Among other features, the functional connection between the braking mechanism of the spindle nut makes obsolete the release or decoupling unit of the gear unit that, until now, was needed. Under normal circumstances, i.e., in both rotational directions of the spindle and with the drive motor turned on, the spindle nut is secured against any torsion by the force acting from the braking mechanism on the spindle nut. Therefore, under normal circumstances, the spindle nut moves in its longitudinal direction, depending on the rotary direction of the spindle. A structural component connected to the linear drive through the spindle nut may be adjusted by means of the speed component resulting from the number of revolutions of the spindle. Alternatively, the adjustment movement of the structural component may be a pivoting motion. However, if the adjustment speed increases, e.g., during the lowering of the structural component, the speed is not determined by the number of revolutions of the spindle. Instead, the force created by the braking mechanism that acts on the spindle nut determines the speed, since the spindle nut can change its position relative to the spindle. This arrangement is possible even if the drive motor is turned on. Consequently, the speed of the structural component linked to the linear drive is determined by the linear speed component of the spindle nut.

The spindle nut may also be moved linearly relative to the spindle when the spindle turns. One advantage offered by the invention lies in the fact that no decoupling or releasing unit is necessary for the adjustment of a structural component at an increased speed relative to the normal speed. In contrast with the models known in the prior art, the adjustment of a structural component independent of the spindle no longer requires a decoupling between the drive unit and the spindle.

Instead, the decoupling occurs between the spindle nut and the connecting segment of the lifting tube. Depending on the configuration of the linear drive, this free mobility of the structural component may be located in the area between the spindle nut and the casing, or between the spindle nut, a casing part and the casing, or between the spindle nut, a guiding part and the casing, or even in the area between the spindle nut and the lifting tube.

With this in mind, one embodiment of the invention provides for the lifting tube to be attached in untwistable (non-rotatable) fashion and the spindle nut to be mounted in revolvable (rotatable) fashion by means of a mounting element firmly set into the lifting tube. This mounting element acts in a wear-and-tear-reducing manner. In one contemplated embodiment, the mounting element is a bearing bushing made of a slide bearing material, an axial slide bearing or a ball bearing. However, as an alternative it is possible to use a ball bearing, and, in addition thereto, a needle bearing.

The lifting tube may be connected to the spindle nut in one of several different ways. For example, the lifting tube may be firmly connected to the spindle nut, and the lifting tube may be mounted with its free end segment in the connecting part in twistable fashion. If, then, the adjustment speed of the connected structural component is to be increased by decreasing the force generated by the braking and transmitting mechanisms, the lifting tube may turn synchronously with the spindle nut.

The braking and transmission mechanisms described above guide the forces to other structural elements in a friction fitting fashion. In one embodiment, a braking and transmission mechanism is formed by at least one loop spring, which will be explained below. Other types of braking and transmission mechanisms include friction fitting clutches, such as multi-plate clutches, cone clutches, and brakes in the form of disc brakes or jaw brakes. Combinations of several kindred or similar or different clutches and brakes are possible as well.

In another embodiment, the spindle nut is guided through the casing part in torque-proof fashion. In this embodiment, the casing part is mounted within the casing in a movable fashion relative to the housing of the electromotive linear drive. With this construction, the adjustment speed of the connected structural component may be changed by manipulating the braking assembly, thereby twisting the casing part synchronously with the spindle nut relative to the casing.

In accordance with another embodiment, the spindle nut is guided in torque-proof fashion through a guiding part, with the guiding part being mounted in rotatable fashion relative to the housing of the electromotive linear drive. If the adjustment speed of the connected structural component is to be changed, the braking assembly is manipulated so that the guiding part may twist synchronously with the spindle nut relative to the housing.

In an advantageous way, the braking and transmission arrangement may be formed by at least one loop spring, a multi plate clutch, a cone brake, a jaw brake or the like. This involves reliable structural components found in the industry that are of a simple design and that operate safely.

In one contemplated embodiment, the brake assembly includes at least one bushing placed in a torque-proof fashion on top of the spindle nut. At least one braking and transmission mechanism or a loop spring envelopes the bushing. The braking and transmission mechanism also includes an exterior handle. One end section or a central section of the braking and transmission mechanism or of the loop spring or springs functionally connects with the handle. In this arrangement, the loop spring may include of a segment bent in a helical shape with several coils, with at least one section, in the end or central section, that deviates from the helically shaped segment. At one end or at central segment, the loop spring is connected via a structural component in torque-proof fashion to the casing or to a casing part or a guide part of the electromotive linear drive. The other end of the loop spring is movable in a pivotal fashion around the rotational axis of the coils relative to the first or relative to the central section of the loop spring. The effect of this construction is that the diameter of the loop spring is movable in pivotal fashion around the rotational axis of the coils, with the diameter of the loop spring is being changeable.

In this respect, all segments of the brake and transmission mechanism or all segments of the loop spring may be activated jointly or sequentially to control the braking effect. With this arrangement, the braking and transmission mechanism transmits indirectly to the spindle nut the force needed to rigidly clamp the spindle nut in place. The braking and transmission mechanism is pre-stressed to generate the force needed to clamp the spindle nut, thereby preventing twisting of the spindle nut. The handle is designed to apply this force as gradually as possible, since the loop spring is expanded by activating the handle. In other words, the force acting on the bushing is reduced in such a way that the adjustment speed of a connected structural component may be controlled.

While it is contemplated that braking and transmission mechanism or, respectively, the loop spring are firmly connected to the handle, the handle in one embodiment includes a control rod whose central longitudinal axis runs parallel to and at a distance from the central longitudinal axis of the spindle. In this embodiment, the rotational axis of the control rod is offset relative to its own central longitudinal axis. In an abstract sense, this creates an eccentric arrangement to the effect that, when the handle is activated, the brake and transmission mechanism and/or the loop spring is activated as soon as it abuts a nose (or protrusion) with one end, and the control rod acts against this end.

Since it is desired for the linear drives of the invention not only to be manufactured in a cost effective manner but also to be extremely compact, the handle is equipped with a switching ring that is mounted, in rotatable fashion, on the bushing. The bushing, in turn, is placed on the spindle nut and is connected functionally to the loop spring so that it may be activated by means of the control rod, with the end segment of the loop spring firmly attached to the control ring.

It is further advantageous if the control rod is designed as a profile bar that has a circular, arc-shaped, external contour at at least one longitudinal edge and a centered constriction (a groove) on at least one side. This design makes an extremely simple mounting of the control rod possible. With such a design, the control rod may be mounted with its circular, arc-shaped, external contour in a rotatable fashion in a guiding channel formed by guiding ridges that are a part of the casing. Alternatively, the external contour may be mounted within a flange pipe attached to the casing.

The guiding ridges are adapted to the circular, arc-shaped contour of the control rod and encompass the section by more than 180°. A constriction on at least one side of the control rod makes rotational movement of the control rod possible. However, in one further, contemplated embodiment, the control rod defines a retraction (or a recessed portion) in the central area of either side thereof. This achieves a symmetric profile relative to the central axes that are arranged at a right angle to each other. In this embodiment, the semicircular exterior contour of the control rod faces away from the brake and transmission mechanism and/or the loop spring. The control rod extends essentially across the area of the spindle so that, in each position of the spindle nut, the force acting on the latter through the brake and transmission mechanism and/or through the loop spring may be reduced.

In another embodiment, the control rod has an annular-shaped profile or an annular-shaped profile section whose orbital center runs alongside of or parallel to the central longitudinal axis of the spindle. To decrease the force acting on the spindle nut, the control rod may be rotated around a rotational axis or dislocated along one axis. A combination of a rotational and a dislocation movement of the control rod may be possible as well.

An additional embodiment provides for a control mechanism with more than one control rod. Here, the control rods may move towards each other around one axis or they may move in one axis relative to one another. In these embodiments, a movement relative to the casing of the electromotive linear drive also may occur simultaneously. In this context, a control rod or control mechanism may be formed by a rigid element, such as, for example, a bend-proof and/or torque-proof element or a flexible strand that is designed to be flexible in at least one degree of freedom.

To ensure that the spindle nut is securely guided during a displacement along the spindle, a guidance ring is provided in its central section. Smaller attachment pieces are provided on both sides of this guidance ring. A bushing is placed upon at least one attachment piece in a rotation-proof fashion. If more than one bushing is provided, at least one of the bushings is encased by the braking and transmission mechanism and/or the loop spring. A lifting tube is placed on top of the other attachment piece. Since the control rod is arranged in the space between the movable lifting tube and the fixed flange pipe and/or the casing, the flange pipe and/or the casing is equipped with corresponding guiding ridges for the spindle nut. In this embodiment, the bushing enveloped by the loop spring faces the drive unit and the bushing mounted in the mounting element faces away from the drive unit. Preferably, the bushings may be made of a metallic material such as, for example, steel. Therefore, the spindle is also made of steel, while the spindle nut is made of a plastic material, for example.

In addition, one of the bushings, preferably the one enclosed by the brake and transmission mechanism and/or the loop spring, is equipped with a tripping segment to activate the end switches that determine the end positions of the spindle nut.

This bushing with the tripping segment has ridges in addition to the switch cam that extend in a longitudinal direction of the spindle and in longitudinal grooves of the casing, of a casing segment, of a guiding part or of a flange pipe. This creates a rotation-proof, lengthwise-movable connection between the first end area or the central area of the brake and transmission mechanism and/or the loop spring and the casing.

In an additional embodiment, the bushing with the tripping segment and the ridges is firmly connected to the spindle nut. Here, the braking and transmission mechanism and/or the loop spring is connected to a casing segment, a guiding part or a flange pipe in such a way that the adjustment speed of the connected structural component is changed when the force generated by the braking and transmission mechanism and/or the loop spring is reduced. To that end, the aforementioned casing segment, the guiding part or the flange pipe is mounted in a rotatable fashion relative to the casing of the linear drive.

The external flange pipe has an oval shape in its basic contour, with ridges attached to the interior surface for the mounting of the control rod as well as for the guidance of the spindle nut. The external flange pipe encases portions of one or both of the spindle or the casing.

In another preferred embodiment, the electromotive linear drive is designed as a furniture drive, preferably as an individual drive, in order to adjust adjustable parts of furniture, such as, for example, slatted frames, hospital and nursing home beds, and easy chairs.

Also, sealing elements are attached at least at the abutting edges of the casing parts that prevent liquids or solids from penetrating the casing. Moreover, parts of the exterior shell of the linear drive may be made corrosion-proof. This results in additional fields of application for the linear drive, such as, for example, the adjustment of ventilation flaps, lifting devices, pivoting and sliding elements, doors and gates in an indoor as well as in an outdoor environment. As may be appreciated by those skilled in the art, corrosion-proofing protects the linear drive from weather, dirt and moisture effects.

The electromotive linear drive has a casing segment to accommodate the spindle nut and the spindle. This casing segment, which is shaped like a flange pipe, may be firmly connected to the casing of the linear drive. In one model, an element in the form of a flange or an adapter is arranged between the flange pipe and the casing. The flange pipe may be firmly connected to the flange, while this flange/flange pipe structural unit is connected to the casing in such detachable fashion that this structural unit can be firmly attached to the casing in various positions of angular rotation.

One embodiment of the electromotive linear drive is particularly advantageous in which one end of the braking and transmission mechanism and/or of the loop spring is firmly connected to another ring. The ring is equipped with a tripping segment and with ridges that extend in a longitudinal direction of the spindle. The ridges are guided in longitudinal grooves of the flange pipe. The end switches are installed in the flange pipe to provide a stop limit for the electric motor. The end switches may be activated by the tripping segments.

In addition, the electromotive linear drive is designed as an individual drive. An individual (or single) drive equipped with a single spindle and a spindle nut placed on top of it. However, it is also conceivable that the linear drive is designed as a so-called double drive. As the name suggests, a double drive is equipped with two spindles and two spindle nuts driven by two drive motors or by one drive motor. If one drive motor is used, an additional speed reduction gear unit driving either spindle may be controllable via clutch elements.

In accordance with another embodiment, at the connection point between the lifting tube and the spindle nut, an internal thread engages with an exterior thread of the spindle nut. It is advantageous if the internal thread is a fine thread, making possible an extremely precise adjustment of the tube relative to the spindle nut. The spindle nut itself has an internal threaded bore, with the thread turns being designed as a motion thread, preferably as a trapezoid thread.

To make it possible for the loop spring or springs to generate a brake momentum as great as possible, a support sleeve is placed on the lifting tube adjacent to the spindle nut. The support sleeve includes a ring-shaped projection directed inwardly. The spindle nut, the lifting tube and the carrying bushing have recesses that are flush with each other. Connecting elements or connection segments, for example fitting springs, engage or attach to the spindle nut, the lifting tube and the carrying bushing to create a form-fitting connection therebetween.

Alternatively to the support sleeve, the lifting tube may be provided with a larger external diameter relative to the end section allocated to the spindle nut. In this case, the support sleeve is integrated in the lifting tube. In another embodiment, the bushing may be integrated together with the lifting tube and/or the support sleeve to form a one-piece unit. Alternatively thereto, it also is possible to connect the support sleeve and the lifting tube in a form-fitting fashion, for example, through threaded or distortion (deformable) segments. In an extension of this embodiment, the support sleeve may be attached to the lifting tube and/or have profile segments that may have ridge-like shapes.

In this embodiment, one or several loop springs are placed on top of the support sleeve. The internal diameters of the loop springs are a little bit smaller in an unmounted state than in a mounted state. Through this, the internal shell of each loop spring is friction-fitted directly to the support sleeve. In one contemplated embodiment, the bushing is connected to the support sleeve and/or to the lifting tube and/or to the spindle through connection segments. The connection segments may include, for example, knurlings, an interlocking profile or connection elements. The connection elements may include several springs that fit in such a way that at least torques are transmittable from the bushing to the spindle nut. In this embodiment, the support ring is provided with a longitudinal slit as well. Moreover, the support ring is loosely arranged between step-like projections or discs in such a way that it transmits a friction force from the allocated loop spring to the support sleeve. In addition, the support ring transmits a torque from the appurtenant loop spring to the spindle nut in a friction fitting fashion.

To hold the arrangement positioned in the area of the connection elements or connection segments or of the fitting springs, a bearing ring with an angular profile is placed on the fitting springs. Recesses are formed on the interior surface of the bearing ring that reach across the fitting springs. The sector of the smaller diameter of the bearing ring faces the drive motor or, respectively, the speed reduction gear unit. On this side, adjacent to the bearing ring, a disc is attached so that an open gutter groove is formed. A projection of the guiding flange engages with this gutter groove so that the latter is rotatable in the gutter groove, but secured from any axial dislocation.

Another embodiment provides for a lifting tube with a great wall thickness in at least one end section so that the lifting tube, together with at least the support sleeve and/or the bushing, forms a single-piece component. Further to this embodiment, the spindle nut may also have a section that is designed at least as a support sleeve and/or lifting tube.

The thread direction of the convolutions of the spindle, of the spindle nut, as well as of an additional nut, is advantageously designed as a right-handed thread in an initial direction. Accordingly, the electromotive linear drive is designed in a way that adjustment forces are generated in an initial direction of movement. In another embodiment, the threads are formed in a second thread direction that is converse to the first thread direction so that the linear drive generates an adjustment force in a second movement direction.

Another embodiment provides for a guiding device to be allocated to the support sleeve to guide the brake assembly in the flange tube. To this end, grooves or projections may be formed on the support sleeve that correspond with the guiding device. The guiding device itself may be formed as a ring or as a ring section. The guiding device is mounted in rotatable fashion together with the support sleeve, is non-relocatable longitudinally, and is guided in the flange tube with its outer shell.

One end of each loop spring is angular and engages with a corresponding recess of the guiding flange, with the second end of each loop spring in a functional connection with a switching ring. Each switching ring is mounted rotatably relative to the guiding flange in such a way that the diameter of the appurtenant loop spring is changeable when the switching ring is turned. Furthermore, an element is allocated to the angular end of the loop spring that is of a higher strength than the guiding flange.

Furthermore, the external contour of the support sleeve is gradated. This way, it is possible that the switching ring, the support ring, the disc and the bushing are supported on each ledge in an axial direction, securing at least these elements from being dislocated in one direction.

To provide further security from axial dislocation, a retaining ring may engage with a groove in the support sleeve so that at least the bushing and/or one switching ring are secured from axial dislocation. It may be further advantageous if an additional disc is allocated to the retaining ring.

It is further advantageous if the support sleeve is made of a metallic or non-metallic material, onto which metallic sleeves or bushings are placed that, for example, are made of hardened steel. It is also advantageous if a tripping segment is arranged on the guiding flange so that an end switch may be activated in order to switch the current flow of the electromotive drive when the tripping element reaches an end position. For a precise guidance of the assembly, ridges are formed on the guiding flange that engage with corresponding longitudinal grooves on the flange tube. Furthermore, the annular projection of the support sleeve forms a distance element, and an additional nut is mounted in the support sleeve on the side that faces away from the spindle nut. Alternatively, this additional nut may be placed into the lifting tube or may be coupled with the spindle nut. The additional nut has a circumferential groove into which a retaining element, for example an O-ring, is placed so that the additional nut is connected to the support sleeve. The retaining element should be elastic.

In several embodiments, the lifting tubes are firmly connected to the spindle nuts. In such embodiments, it is advantageous if the connecting parts for the connection of the electromotive drive are rotatably mounted at the free ends of the lifting tube on structural components that are adjustable relative to other structural components. In this respect, it is particularly advantageous if each connecting part is formed as a fork head with a central slit and a transverse bore. However, other embodiments of each connecting part are possible, for example, flanges or cones having longitudinal and/or transversal bores or steps and threaded heads.

In one embodiment, the rotatably mounted connecting part is designed as a structural unit so that it may be placed into or at least partially into, or attached to, the free end of the lifting tube. This structural unit consists essentially of a first structural component that is firmly connected to the lifting tube, for example, by means of a thread or distortions. A second part is then mounted in such a way relative to the first structural component that it is rotatable. The rotatable, structural components is provided with at least one mounting element that is designed as a ball bearing and/or a friction bearing and/or a combination thereof so that forces may be absorbed in a radial as well as in an axial direction between the first structural component and the second structural component, with at least the axial forces being able to be guided into the lifting tube.

Furthermore, in the embodiments shown, at least one sealing element is provided that protects the mounting against any penetration of dust and moisture from the outside. Another embodiment provides for a connection element that connects the first structural component and the second with each other and provides mutual support. In a preferred embodiment, the connecting element is formed by a screw that is guided through the first and second structural elements and that is twisted into the first or second structural component. Alternatively, the connecting element may be a cone or a bolt that is formed as a single-piece formed component together with the first or second structural component.

BRIEF DESCRIPTION OF THE DRAWINGS

The invention will be explained in detail by means of the enclosed drawings. In the drawings.

DESCRIPTION OF EMBODIMENT(S) OF THE INVENTION

Figure 1:
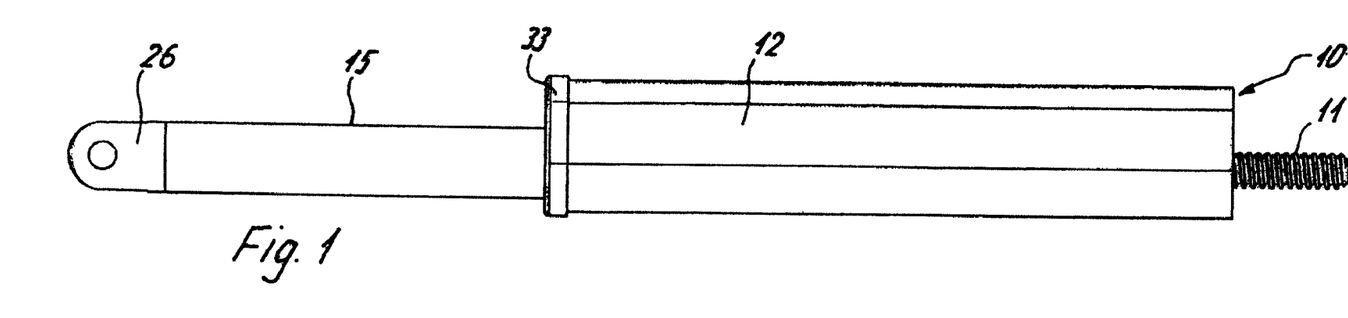
FIG. 1 is a partial, side view of a linear electromotive drive according to the invention, showing the spindle.
Figure 2:
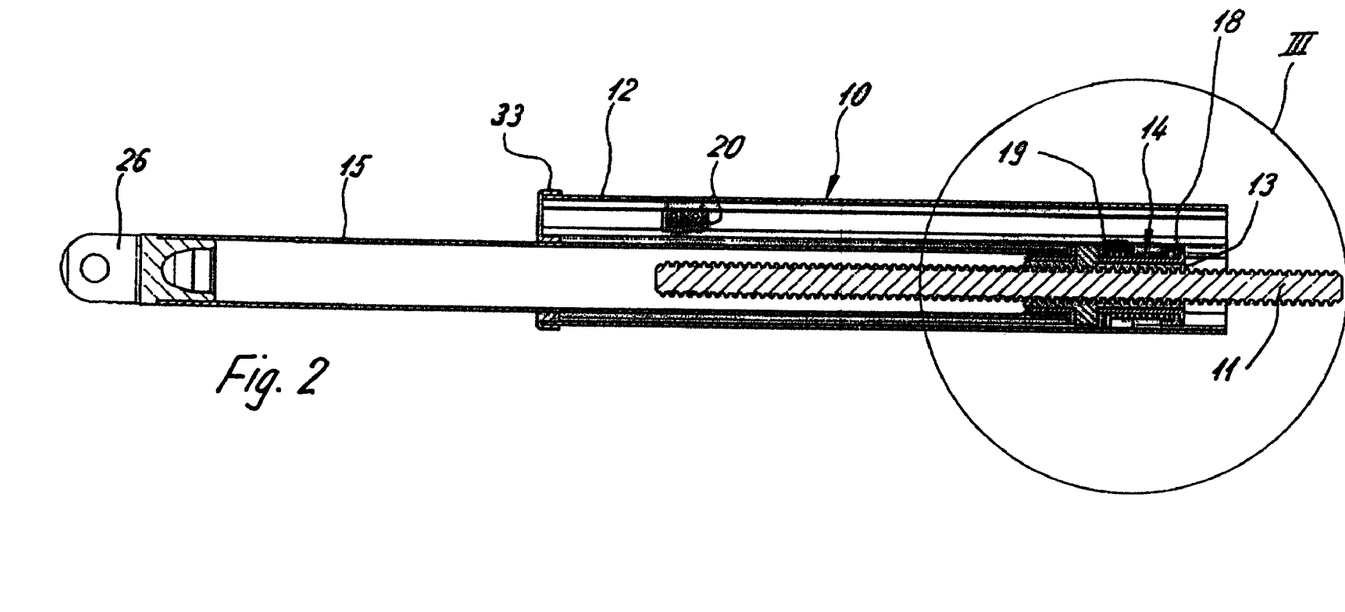
FIG. 2 is a cross-sectional side view of the portion of the linear electromotive drive shown in FIG. 1.
Figure 3:
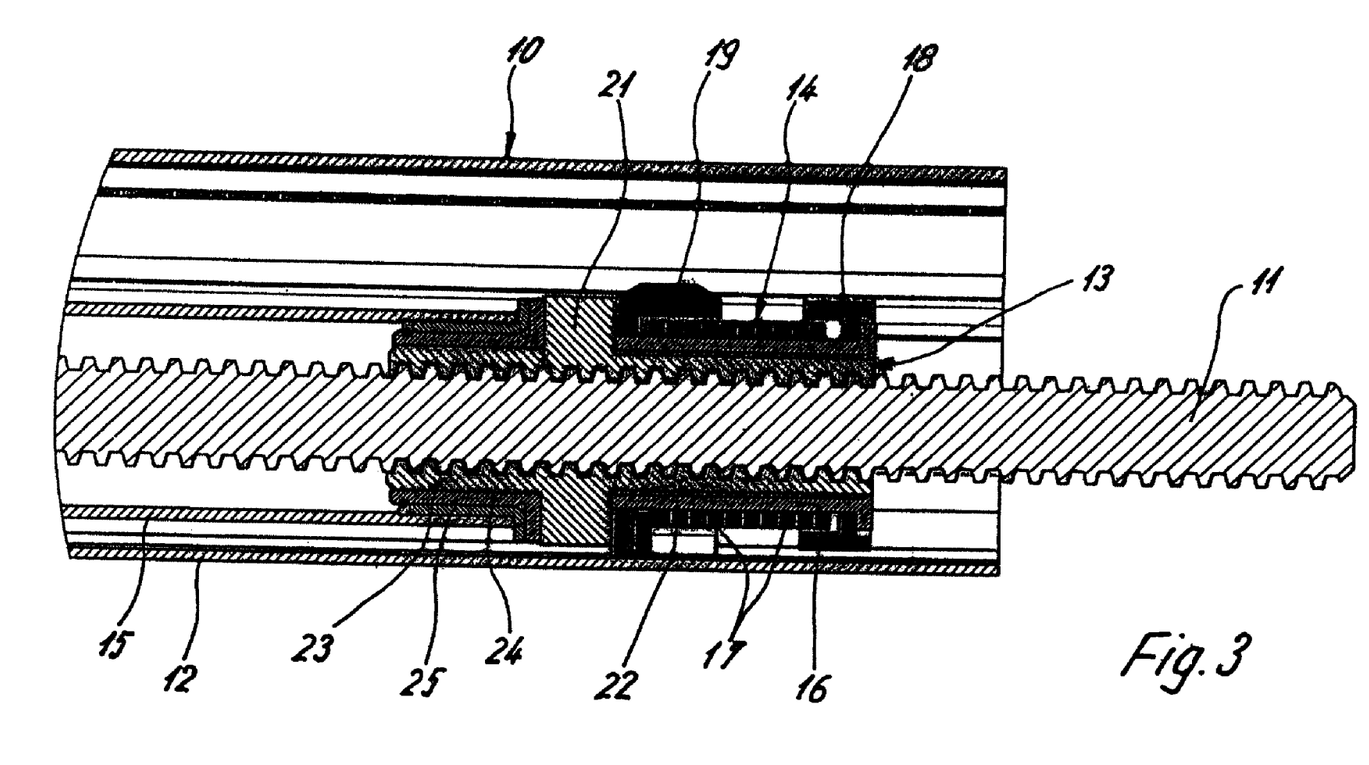
FIG. 3 is an enlarged, cross-section of the portion of the linear electromotive drive within the area marked by III in FIG. 2.

For reasons of a simplified representation of the invention, only the part of the linear drive 10 is shown in FIGS. 1 through 6. As the figures show, this section contains a spindle 11 that is drivable in rotatory fashion by a drive unit not shown. The drive unit consists of a drive motor, such as a direct current motor, and a speed reduction gear unit which, in one embodiment, consists of a worm drive. Worm drives offer advantages for the construction of the drive unit since such drives offer a high revolution ratio. In the embodiment shown, the spindle 11 extends within an exterior flange tube 12. The exterior flange tube may be firmly connected to a casing (not shown) or may be integrally formed with the casing as a single element. The free end of the flange tube 12 faces away from the drive unit and is closed by an end cap 33. A spindle nut 13, explained in detail by way of FIG. 3, is placed on the spindle 11 that is in a functional connection with a braking assembly 14. The spindle nut 13 is connected to a lifting tube 15 in such a way that the lifting tube 15 may be retracted and extended relative to the flange tube 12, depending on the rotational direction of the spindle 11.

Figure 6:
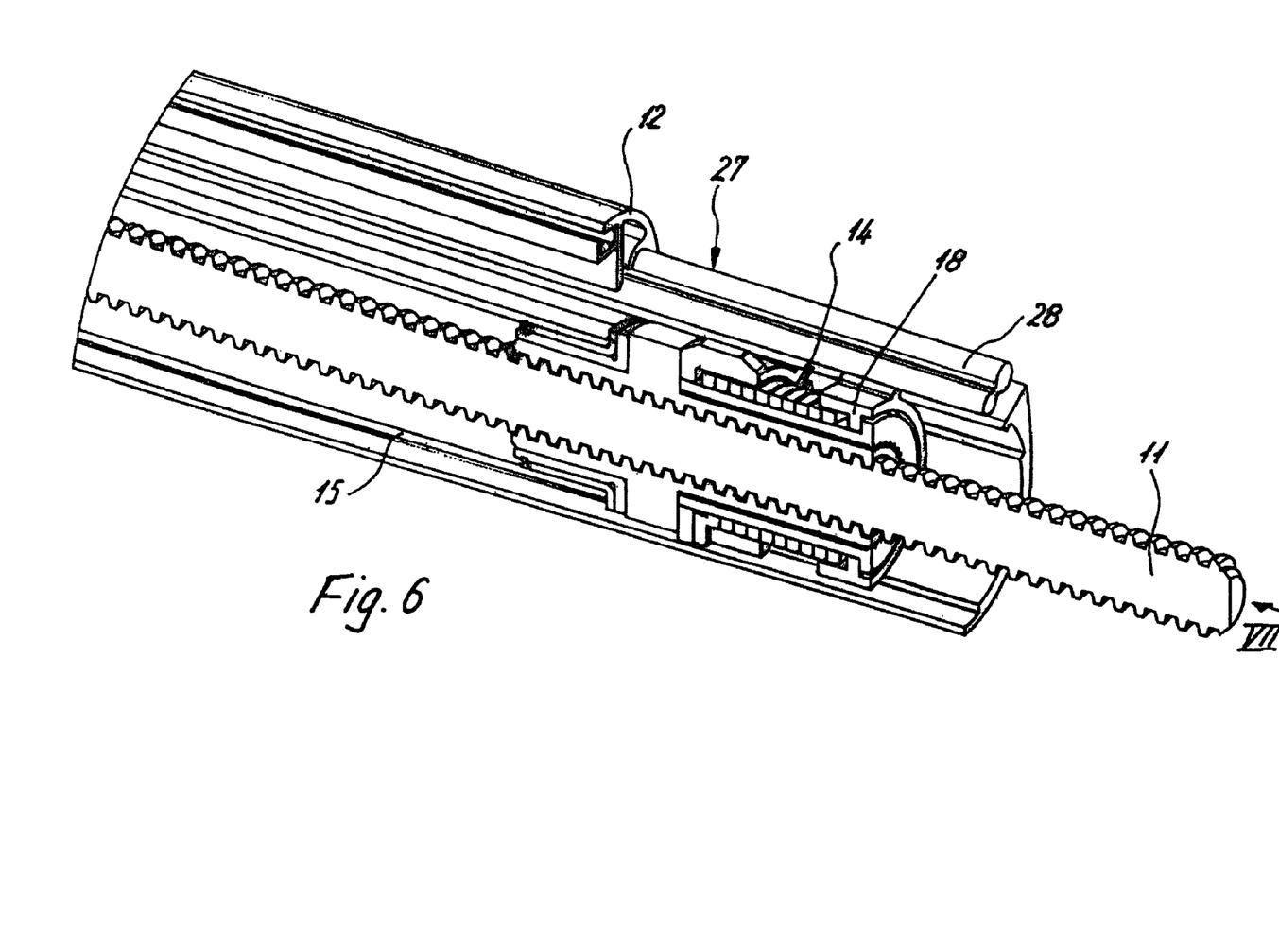
FIG. 6 is an enlarged, cross-sectional perspective view of the portion of the linear electromotive drive encircled by the area marked VI in FIG. 5.
Figure 7:
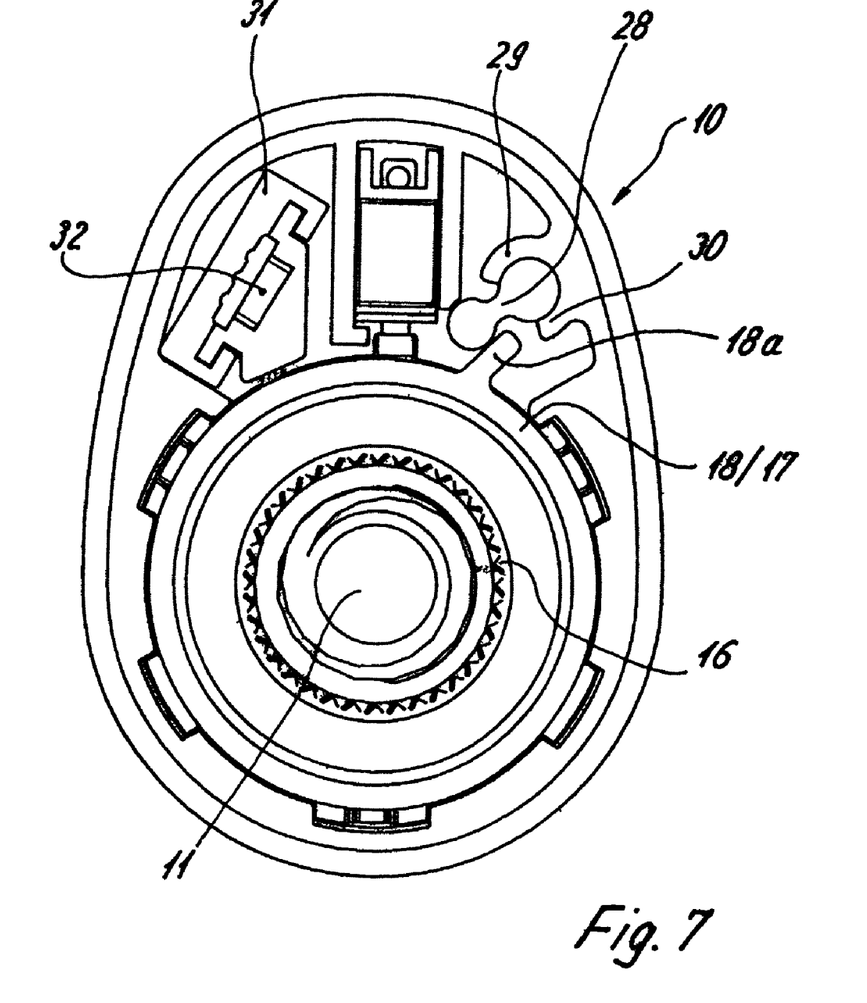
FIG. 7 is a frontal view, taken in the direction of the arrow VII in FIG. 6.

The braking assembly 14 includes a bushing 16 placed in non-rotatable fashion on top of the spindle nut 13, a loop spring 17 encompassing the bushing 16, and a switching ring 18 that is rotatable relative to the bushing 16. This arrangement is illustrated in FIGS. 6 and 7. Since after manufacturing, the interior diameter of the loop spring 17 is smaller than the external diameter of the bushing 16, the elasticity of the loop spring 17 causes it to rest against the exterior surface of the bushing 16 in a force-fitting fashion. The allocated end of the loop spring 17 is firmly connected to the switching ring 18. The opposite end of the loop spring 17 is firmly connected to a second ring that has a tripping segment 19 and ridges. The ridges, which are not shown in detail, are guided in longitudinal grooves in the flange tube 12. Furthermore, end switches 20 also are accommodated in the flange tube 12 to limit the operation of the electromotor. These end switches are activated by the tripping segment 19.

Although not shown in the illustration, it is contemplated that the bushing 16 may be encased by more than one loop spring 17 or by multiple loop spring sections 17a, 17b. Together, the loop springs 17 may form a spring package, with the individual springs 17 being coupled to each other, with their front end sections facing each other. It is also contemplated that individual springs 17 may be connected to one another in a continuous fashion with non-coiled segments between the individual springs 17.

In its central section, the spindle nut 13 is provided with a guiding flange 21 that is guided along the interior of the flange tube 12. On either side of this guiding flange 21, the spindle nut is provided with projections 22, 23 with diameters smaller than the diameter of the guiding flange 21. The bushing 16, surrounded by the loop spring 17, is firmly placed on top of the projection 22. The projection 22 connects in a form fitting fashion by means of longitudinal ridges that engage in corresponding, counterpart grooves. A bushing 24 is mounted in a friction bearing bushing 25 that is, in turn, firmly placed into the lifting tube 15. The bushing firmly rests on top of projection 23. As FIG. 3 shows, the bushings 16 and 24 are angularly shaped in their profile. The braking assembly 14 faces the drive unit, which is not shown.

Figures 4, 5:
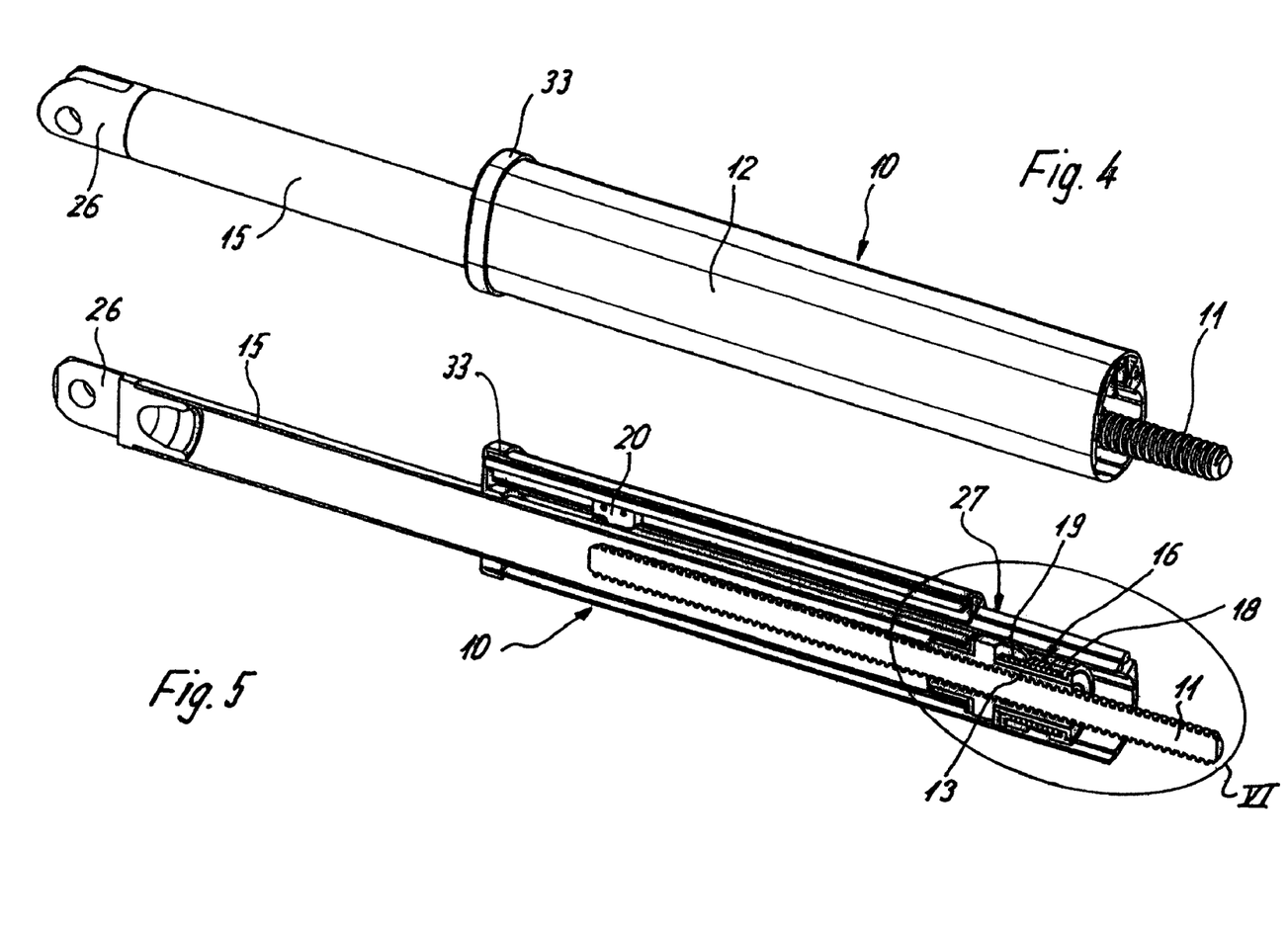
FIG. 4 is a perspective, end view of the linear electromotive drive illustrated in FIG. 1.
FIG. 5 is a perspective, cross-sectional view of the linear electromotive drive illustrated in FIG. 2.

FIGS. 4 and 5 show part of the linear drive in a perspective representation. These figures show that a connection element in the form of a fork head 26 is affixed to the free end of the lifting tube facing away from the drive unit. FIGS. 4 and 5 also clearly show the basic contour of the flange tube 12 as oval-shaped. These figures also show that the spindle 11 is offset relative to the median longitudinal axis. Particularly, FIG. 4 shows ridges formed on the interior of the flange tube 12. A handle 27 for the activation of the switching ring 18 and for guiding the spindle nut 13 is mounted within the flange tube 12. As FIGS. 6 and 7 show in particular, the handle 27 consists of a switching rod 28 in the form of a profile rod. The switching rod 28 contacts a nose on the switching ring 18 so that the switching ring 18 may be twisted relative to the spindle nut 13, thereby expanding the loop spring 17. The switching rod 28 extends essentially coextensively with the spindle 11 so that the switching ring 18 may be turned regardless of the position of the spindle nut 13. In addition to that, the switching rod 28 is located in a free space between the lifting tube 15 and the flange tube 12. The switching rod 28 runs parallel to and at a distance from the spindle 11. Also, the rotational axis of the switching rod 28 is offset relative to the median longitudinal axis, which achieves the effect of an eccentric that facilitates actuation of twisting of the switching ring 18.

FIG. 7 shows that the switching rod 28 consists of two round rods connected to each other via a ridge. The section turned away from the spindle 11 is shaped like a circle arc, or at least semicircular, and lies within a channel that is formed by two ridges 29, 30 that are shaped accordingly. In all, the ridges 29, 30 encompass the switching rod at an angle that is larger than 180° so that the switching rod 28 is suitably rotatable in the channel formed by the ridges 29, 30. To facilitate this rotation, the switching rod 28 is provided in its central section on both sides with depressions or retractions. The section of the switching rod facing the spindle 11 contacts an outwardly-turned ridge 18a on the switching ring 18. Although not shown, the switching rod 28 may be turned by a handle attached outside of the casing, or by a slide. To this end, the casing of the linear drive 10 or the flange tube 12 is equipped with a corresponding opening. In the area opposite the switching rod 28, a retaining rail is positioned in the flange tube 12 that may also be formed by attached ridges. This retaining rail contains a linear potentiometer 31 with a pickup shoe 32 that is coupled with the spindle nut 13. The linear potentiometer 31 moves synchronously with the spindle nut 13 in a longitudinal direction of the flange tube 12 and helps to lock the spindle nut 13 in a respective position when the drive motor is turned off.

It should also be mentioned that the spindle 11, the bushing 16, and the lifting tube 15 are made of steel while the spindle nut 13 and the casing are essentially made of a plastic material. The flange tube 12 may be made of plastic or of aluminum.

During normal operation, i.e., when the structural component coupled with the linear drive 10 is adjusted with the drive motor turned on, a strong force is transmitted by the prestressed loop spring 17 to the bushing 16. In fact, the force is so strong that the spindle nut 13 is connected therewith in form-fitting fashion and will not turn. Moreover, the force is strong enough to discourage the loop spring 17 and the bushing 16 from being moved longitudinally with respect to the spindle nut 13.

In the case where the connected structural component is to be lowered at a higher speed, the switching rod is turned slightly in a counterclockwise direction. With application of external pressure on the switching rod, the loop spring expands. This reduces both the force and the frictional torque on the bushing 16, permitting the structural component to be lowered at higher speed. If it is desired to lower the connected structural component at an even higher speed, additional pressure may be applied to the loop spring 17 to expand the loop spring 17 to the point that it transmits no force to the bushing 16. As may be appreciated by those skilled in the art, the amount of pressure applied to the switching rod will affect the speed at which the connected structural component is lowered.

As soon as the actuating member for the switching rod 28 is released, the loop spring 17 contracts to slow the movement of the spindle nut 13 and prevent its further rotation. In contrast with the embodiments known so far, the spindle nut 13 is not secured against twisting in form-fitting fashion. Instead, the spindle nut is secured against twisting in force-fitting fashion through the effect of the loop spring 17. The speed reduction gear unit may be designed to the effect that it will be self-locking so that the force generated by the connected structural component is retained by means of the speed reduction gear unit when the drive motor is turned off.

Figure 8:
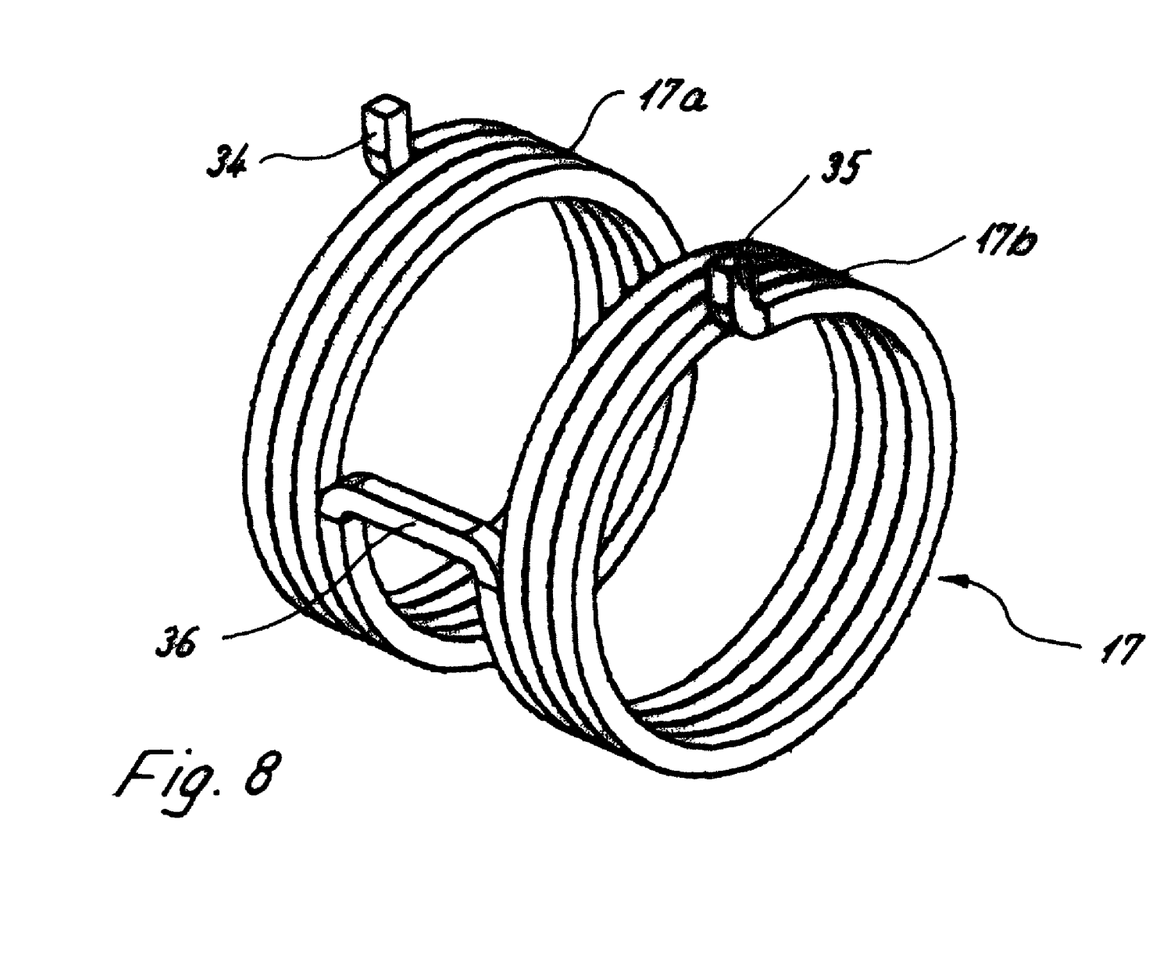
FIG. 8 is a perspective illustration of a potential embodiment of a loop spring.

FIG. 8 shows one contemplated embodiment of the loop spring 17. The loop spring 17 includes two interspaced sections 17a, 17b, have the same number of convolutions spaced apart from one another. The sections 17a, 17b are connected via a central ridge 36 that runs parallel to and at a distance from the central longitudinal axis of the loop spring 17, i.e., it is located in the area of the convolutions of the segments 17a and 17b. FIG. 8 furthermore shows that the free end sections 34, 35 of the loop spring 17 and/or of the sections 17a, 17b are angled to protrude exteriorly from the main body of the loop spring 17. The free end sections 34, 35 engage in complimentary, abutting structural parts, as described above.

Figure 9:
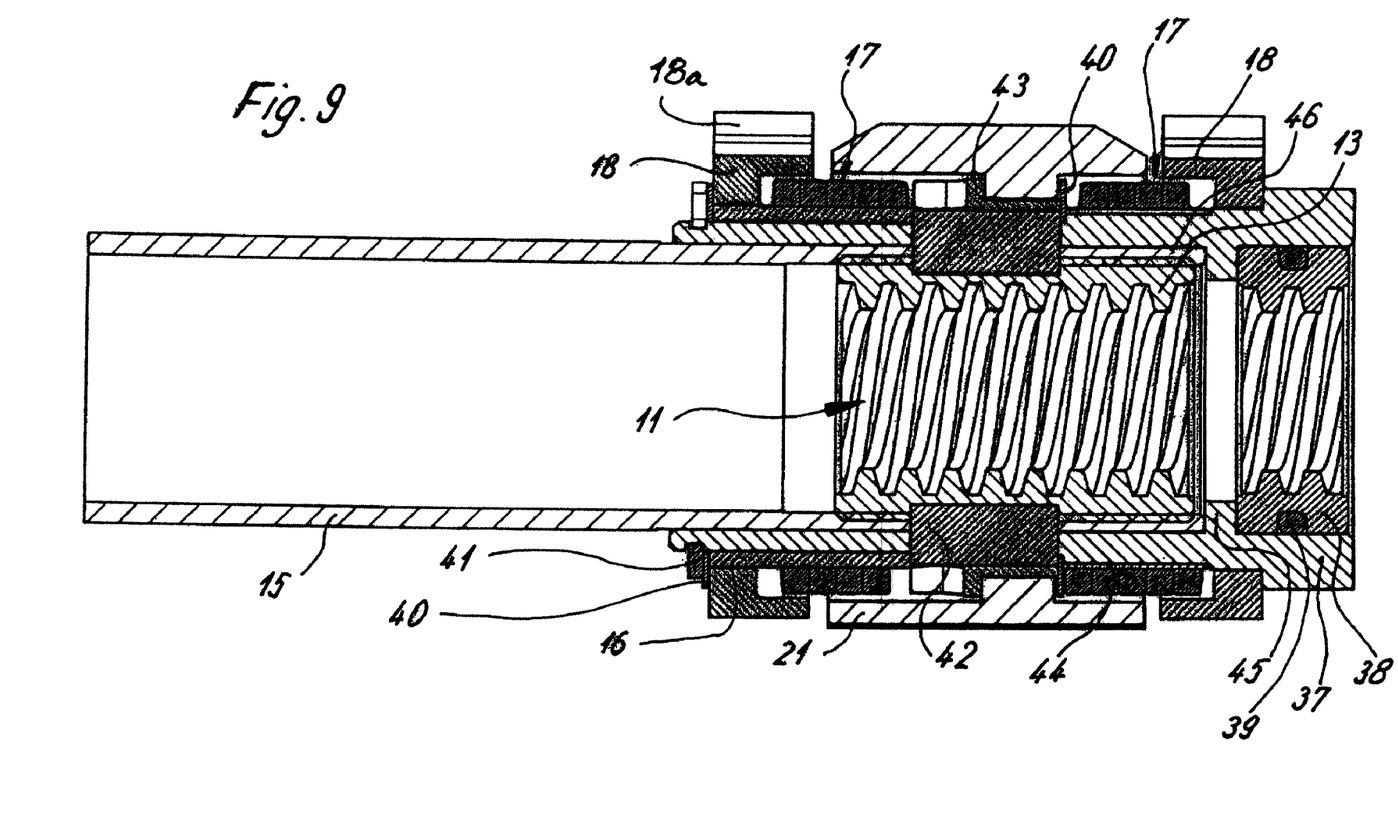
FIG. 9 is an enlarged, partial, cross-sectional view of an additional embodiment of the linear drive in accordance with the invention.

FIG. 9 shows a longitudinal cross section of the electromotive linear drive 10. For reasons of a simplified representation, the casing and the flange tube are not shown in this figure. The lifting tube 15 is provided with a thread at the end section allocated to the spindle nut 13 that is marked by reference mark 46. In a preferred embodiment, the interior thread is a fine pitch thread and is engaged with a corresponding exterior thread of the spindle nut 13. The spindle nut 13 is screwed into the lifting tube 15 and connected to the lifting tube via this thread 46. In addition, the spindle nut 13 has an interior threaded bore with movable threads. In the embodiment shown, the movable threads are a trapezoidal.

A support sleeve 37 is positioned on the lifting tube 15 in the end section with a graduated interior bore. This support sleeve 37 is made of plastic or metal. The spindle nut 13, the lifting tube 15 and the support sleeve 37 define recesses in a flush arrangement with each other into which several connecting elements, in the form of fitting springs 42, are inserted, thereby firmly connecting the spindle nut 13, the lifting tube 15 and the support sleeve 37 to each other.

In one contemplated variation of this embodiment, the end section of the lifting tube 15 allocated to the spindle nut 13 may include a corresponding wall thickness so that the support sleeve 37 may be integrated in the lifting tube 15. In still another contemplated variation, the support sleeve 37 and the lifting tube 15 may be connected to each other in a form-fitting fashion, for example by means of threads or distortion sections.

In the embodiment shown, two loop springs 17 are placed on the support sleeve 37, spaced apart from each other. In an uninstalled state, the interior diameters of the loop springs are a little bit smaller than in an installed state. This causes the exterior surfaces of the two loop springs 17 to abut the support sleeve 37 directly in a friction-fitting fashion. In the embodiment illustrated in FIG. 9, the left loop spring 17 in the illustration is placed on a bushing 16. The right loop spring 17 in the illustration is placed on a support ring. In the embodiment shown, the bushing 16 is connected, for example, by several fitting springs 42 to the support sleeve 37 and/or the lifting tube and/or to the spindle nut 13 so that at least torque moments may be transferred from the bushing 16 to the spindle nut 13.

In the embodiment shown, the support ring 44 is provided with a longitudinal slit and is loosely positioned between graduated projections or discs 40. The support ring 44 transmits the friction force from the loop spring 17 to the support sleeve 37 or, respectively, transmits a torque moment from the appurtenant loop spring 17 to the spindle nut 13 via the friction-fit.

Furthermore, FIG. 9 shows that a mounting ring 43 is placed on the section of the fitting springs 42 that has an angular profile. Projections extend from the interior surface that reach across the fitting springs 42. A disc 40 is placed on the front side of the mounting ring 43. The disc 40 has a smaller diameter than the mounting ring 43 so that a ring groove is formed that opens outwardly from the exterior surface of the mounting ring 43. A projection of the guiding flange 21 engages in this ring groove so that the guiding flange 21 is rotatably mounted in the ring groove but secured against any axial dislocations. As noted above, the ends 34, 35 of each loop spring 17 are angled and engage in a corresponding recess in the guiding flange 21. The second end of each loop spring 17 functionally connects with a respective switching ring 18. Each switching ring 18 is mounted in rotatable fashion relative to the guiding flange 21 so that the diameter of the loop spring 17 associated with the respective switching ring 18 changes when a switching ring 18 is twisted.

The support sleeve 37 has a graduated exterior contour. The switching ring 18, the support ring 44, the disc 40 and the bushing 16 rest on the surfaces from one step landing to the next step landing so that they are secured against any dislocation in the axial direction.

Additional securing elements, for example, a securing ring 41, engage in a groove of the support sleeve 37 and secure at least the bushing 16 and/or a switching ring 18 against any axial dislocation. It may be advantageous if another disc is allocated to the securing ring 41.

Furthermore, a tripping segment 19 is formed on the guiding flange 21. The tripping segment 19 interacts with a switch (not shown) that may be actuated to control power to the electronic drive unit when the tripping segment is at an end position of its travel path.

Also, ridges (not shown) formed on the guiding flange 21 slide in the longitudinal grooves of the flange tube 12. As FIG. 9 shows, the support sleeve 37 is provided with a ring projection 45 against which an additional nut 38 rests on the side facing away from the spindle 11 and/or the spindle nut 13. In one contemplated variation to this embodiment, the additional nut 38 also may be placed into the lifting tube 15 or coupled with the spindle nut 13. The additional nut 38 has a circumferential radial groove into which a retaining element 39 is placed. This retaining element connects the additional nut 38 to the support sleeve 37. In the simplest embodiment, the retaining element 39 is elastic. In the embodiment shown, it is an O-ring.

Figure 10:
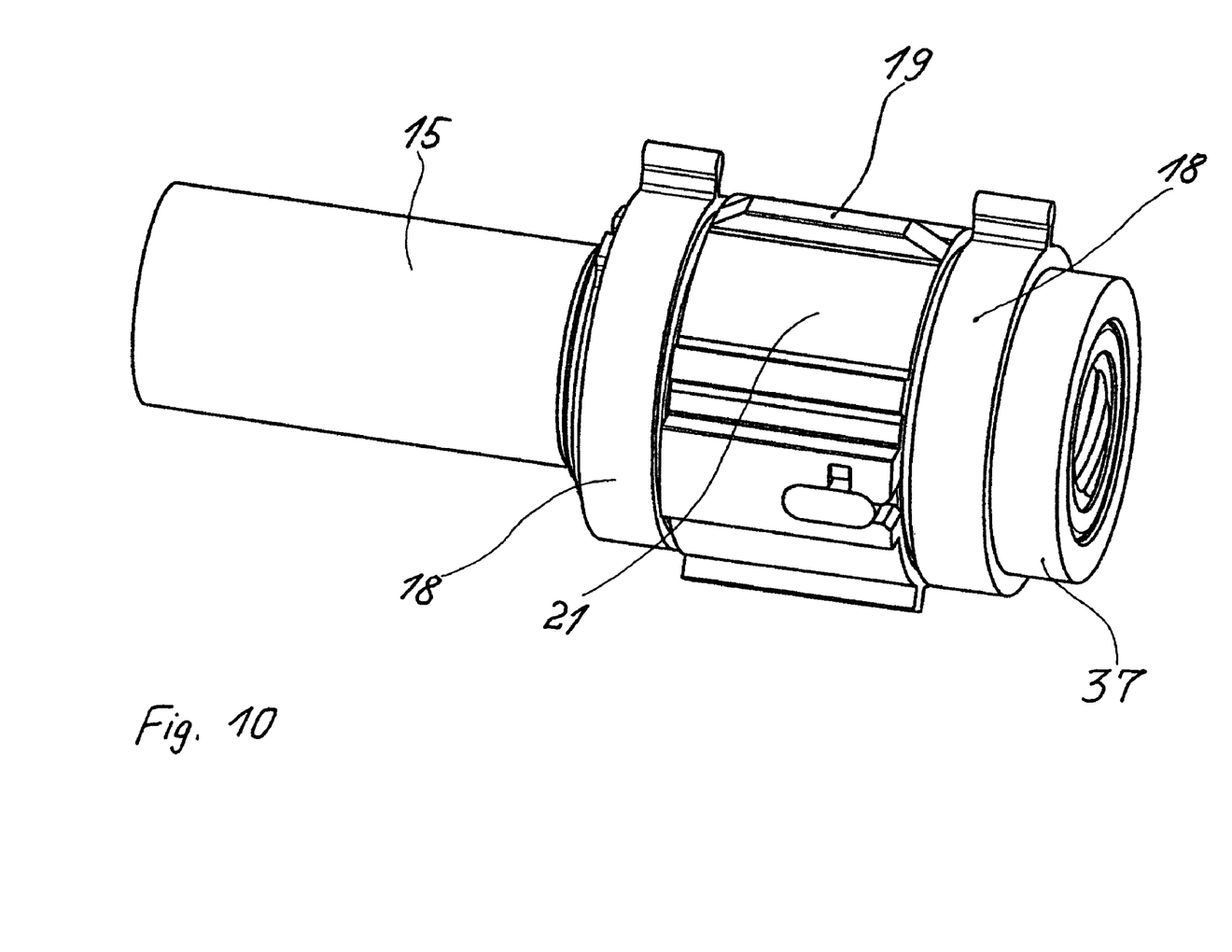
FIG. 10 is an exterior view of the embodiment according to FIG. 9.

FIG. 10 shows the position between the guiding flange 21 and the switching ring 18 and/or the tripping segment 19. This achieves a compact construction with an easy operation. The figure also shows that the support sleeve 37 protrudes relative to the switching ring 18.

As may be appreciated by those skilled in the art, the embodiments described herein are merely representative of the scope of the invention. Equivalents and variations of the described embodiments are intended to be encompassed by the invention, as would be understood by those skilled in the art.

What is claimed is:

1. An electromotive linear drive, comprising:
   a drive unit comprising a drive motor;
   a spindle driven by the drive unit;
   a spindle nut disposed on the spindle, wherein the spindle nut is movable longitudinally on the spindle;
   a lifting tube operatively connected to the spindle nut so that the spindle nut moves together with the lifting tube;
   a connecting part disposed on a free end of the lifting tube;
   a braking assembly being operatively connected to the spindle nut via an adjustable, frictional connection;
   wherein the braking assembly is manipulable to adjust the frictional connection,
   wherein, during operation of the drive motor, the spindle nut frictionally engages the braking assembly, thereby preventing rotation of the spindle nut,
   wherein, with the drive motor turned off, the frictional connection is configured to be adjusted to permit the spindle nut to rotate with respect to the spindle, thereby manipulating a linear speed component of the lifting tube
   at least one bushing non-rotatably disposed on the spindle nut;
   at least one braking and transmission mechanism encompassing the bushing;
   a handle operatively connected to the braking and transmission mechanism permitting manipulation of the braking and transmission mechanism from a position exterior thereto: and
   a loop spring disposed on the at least one bushing comprising at least two coiled segments connected to each other by a central ridge disposed a predetermined distance from a median axis of the loop spring.

2. The electromotive linear drive of claim 1, wherein the braking assembly comprises:
   at least one loop spring disposed on the spindle nut.

3. The electromotive linear drive of claim 1, wherein the braking and transmission mechanism acts on the at least two coiled segments, thereby adjusting the frictional connection between the braking assembly and the spindle nut.

4. An electromotive linear drive, comprising:
   a drive unit comprising a drive motor;
   a spindle driven by the drive unit;
   a spindle nut disposed on the spindle, wherein the spindle nut is movable longitudinally on the spindle;
   a lifting tube operatively connected to the spindle nut so that the spindle nut moves together with the lifting tube;
   a connecting part disposed on a free end of the lifting tube;
   a braking assembly being operatively connected to the spindle nut via an adjustable, frictional connection;
   wherein the braking assembly is manipulable to adjust the frictional connection,
   wherein, during operation of the drive motor, the spindle nut frictionally engages the braking assembly, thereby preventing rotation of the spindle nut,
   wherein, with the drive motor turned off, the frictional connection is configured to be adjusted to permit the spindle nut to rotate with respect to the spindle, thereby manipulating a linear speed component of the lifting tube
   at least one bushing non-rotatably disposed on the spindle nut;
   at least one braking and transmission mechanism encompassing the bushing;
   a handle operatively connected to the braking and transmission mechanism permitting manipulation of the braking and transmission mechanism from a position exterior thereto; and
   a control rod defining a central, longitudinal axis extending parallel to and disposed a predetermined distance from a longitudinal axis of the spindle, wherein the control rod also defines a rotational axis offset from central, longitudinal axis.

5. The electromotive linear drive of claim 4, wherein the control rod extends substantially coextensively with a travel path of the spindle.

6. The electromotive linear drive of claim according to claim 4, wherein the control rod rotates about the rotational axis to operate on the spindle nut, thereby reducing a force of the frictional connection between the braking assembly and the spindle nut.

7. The electromotive linear drive of claim 4, further comprising:
   a switching ring that is turnable by the control rod, wherein the switching ring is disposed on the at least one bushing,
   wherein a portion of the at least one braking and transmission mechanism is disposed on the switching ring.

8. An electromotive linear drive, comprising:
   a drive unit comprising a drive motor;
   a spindle driven by the drive unit;
   a spindle nut disposed on the spindle, wherein the spindle nut is movable longitudinally on the spindle;
   a lifting tube operatively connected to the spindle nut so that the spindle nut moves together with the lifting tube;
   a connecting part disposed on a free end of the lifting tube;
   a braking assembly being operatively connected to the spindle nut via an adjustable, frictional connection;
   wherein the braking assembly is manipulable to adjust the frictional connection, wherein, during operation of the drive motor, the spindle nut frictionally engages the braking assembly, thereby preventing rotation of the spindle nut, wherein, with the drive motor turned off, the frictional connection is connected to be adjusted to permit the spindle nut to rotate with respect to the spindle, thereby manipulating a linear speed component of the lifting tube;

wherein the lifting tube defines an interior thread that engages with an external thread of the spindle nut;

a support sleeve disposed on the lifting tube adjacent to the spindle nut;

wherein the support sleeve includes an interior, annular-shaped projection; and wherein the spindle nut and the support sleeve define recesses that are aligned with one other, thereby permitting connecting elements to be disposed therein to establish a form-fitting connection between the support sleeve and the spindle nut.

9. The electromotive linear drive of claim 8, wherein the lifting tube and the support sleeve are threadedly connected to one another.

10. The electromotive linear drive of claim 8, further comprising:

at least one loop spring disposed on the support sleeve, wherein an interior diameter of the at least one loop spring is smaller that an exterior diameter of the support sleeve, thereby permitting the at least one loop spring to engage the support sleeve in a friction-fitting fashion.

11. The electromotive linear drive of claim 10, further comprising:

at least one supporting ring disposed between an interior surface of the at least one loop spring and an exterior surface of the support sleeve.

12. The electromotive linear drive of claim 11, further comprising:

a fitting connecting the support sleeve to at least one of the lifting tube or the spindle nut.

13. The electromotive linear drive of claim 11, wherein the at least one support ring includes a longitudinal slit disposed between at least one of projections or discs such that a frictional force is transmitted from the at least one loop spring at least to one of the support sleeve or the spindle nut via a friction fitting.

14. An electromotive linear drive, comprising:

a drive unit comprising a drive motor;

a spindle driven by the drive unit;

a spindle nut disposed on the spindle, wherein the spindle nut is movable longitudinally on the spindle;

a lifting tube operatively connected to the spindle nut so that the spindle nut moves together with the lifting tube;

a connecting part disposed on a free end of the lifting tube;

a braking assembly being operatively connected to the spindle nut via an adjustable, frictional connection;

wherein the braking assembly is manipulable to adjust the frictional connection, wherein, during operation of the drive motor, the spindle nut frictionally engages the braking assembly, thereby preventing rotation of the spindle nut, wherein, with the drive motor turned off, the frictional connection is configured to be adjusted to permit the spindle nut to rotate with respect to the spindle, thereby manipulating a linear speed component of the lifting tube;

wherein the lifting tube defines an interior thread that engages with an external thread of the spindle nut;

at least one bushing non-rotatably disposed on the spindle nut;

a switching ring disposed on the at least one bushing;

a support sleeve surrounding the spindle nut;

at least one loop spring disposed on the support sleeve; and a guiding flange disposed around the support sleeve;

wherein a first end of the at least one loop spring is angled to engage a recess in the guiding flange, and wherein a second end of the at least one loop spring functionally connects with the switching ring.

15. The electromotive linear drive of claim 14, wherein the switching ring rotates with respect to the guiding flange such that a diameter of the at least one loop spring is changeable when the switching ring is turned.

16. The electromotive linear drive of claim 14, wherein ridges are formed on the guiding flange to engage slidably with longitudinal grooves on the flange pipe.

* * * * *